United States Patent
Bogdahn

(10) Patent No.: US 8,061,162 B2
(45) Date of Patent: Nov. 22, 2011

(54) METHOD FOR PRODUCING A TUBE OF QUARTZ GLASS BY ELONGATING A HOLLOW CYLINDER OF QUARTZ GLASS

(75) Inventor: Thomas Bogdahn, Karlstein (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 653 days.

(21) Appl. No.: 11/920,369

(22) PCT Filed: May 11, 2006

(86) PCT No.: PCT/EP2006/062241
§ 371 (c)(1),
(2), (4) Date: Nov. 14, 2007

(87) PCT Pub. No.: WO2006/122904
PCT Pub. Date: Nov. 23, 2006

(65) Prior Publication Data
US 2009/0019893 A1    Jan. 22, 2009

(30) Foreign Application Priority Data

May 16, 2005  (DE) .......................... 10 2005 023 211
Jun. 17, 2005  (DE) .......................... 10 2005 028 219

(51) Int. Cl.
C03B 23/04       (2006.01)
C03B 23/043      (2006.01)
C03B 23/047      (2006.01)

(52) U.S. Cl. .......................... 65/108; 65/435

(58) Field of Classification Search .................. 65/109, 65/276, 439
See application file for complete search history.

(56) References Cited

U.S. PATENT DOCUMENTS

| | | | |
|---|---|---|---|
| 4,274,854 A * | 6/1981 | Pleibel et al. ................. | 65/403 |
| 5,785,729 A * | 7/1998 | Yokokawa et al. ............ | 65/385 |
| 6,907,757 B2 * | 6/2005 | Kuwahara et al. ............ | 65/424 |
| 2002/0116956 A1 | 8/2002 | Fukunaga et al. | |

FOREIGN PATENT DOCUMENTS

EP      1 229 004 A2    8/2002
JP      2000-233938     3/2000

OTHER PUBLICATIONS

Espacenet English language abstract of JP2000-233938, Mar. 6, 2000.

* cited by examiner

Primary Examiner — Matthew Daniels
Assistant Examiner — Cynthia Szewczyk
(74) Attorney, Agent, or Firm — Tiajoloff & Kelly LLP

(57) ABSTRACT

In a known method for producing a tube of quartz glass by elongating a hollow cylinder of quartz glass having an outer diameter AD, said cylinder is continuously supplied to a heating zone with a vertically oriented heating tube having an inner diameter d, with the proviso that the diameter ratio d/AD is set to a value ranging from 1.02 to 1.7. The hollow cylinder is softened therein zonewise, and a tubular strand is drawn off from the softened region and shortened to obtain the tube. Starting therefrom, in order to optimize the dimensional stability of the quartz glass tube obtained, it is suggested according to the invention that the heating zone should have a length L which is set such that the ratio L/d is smaller than 0.9.

11 Claims, 2 Drawing Sheets

Figure 1:
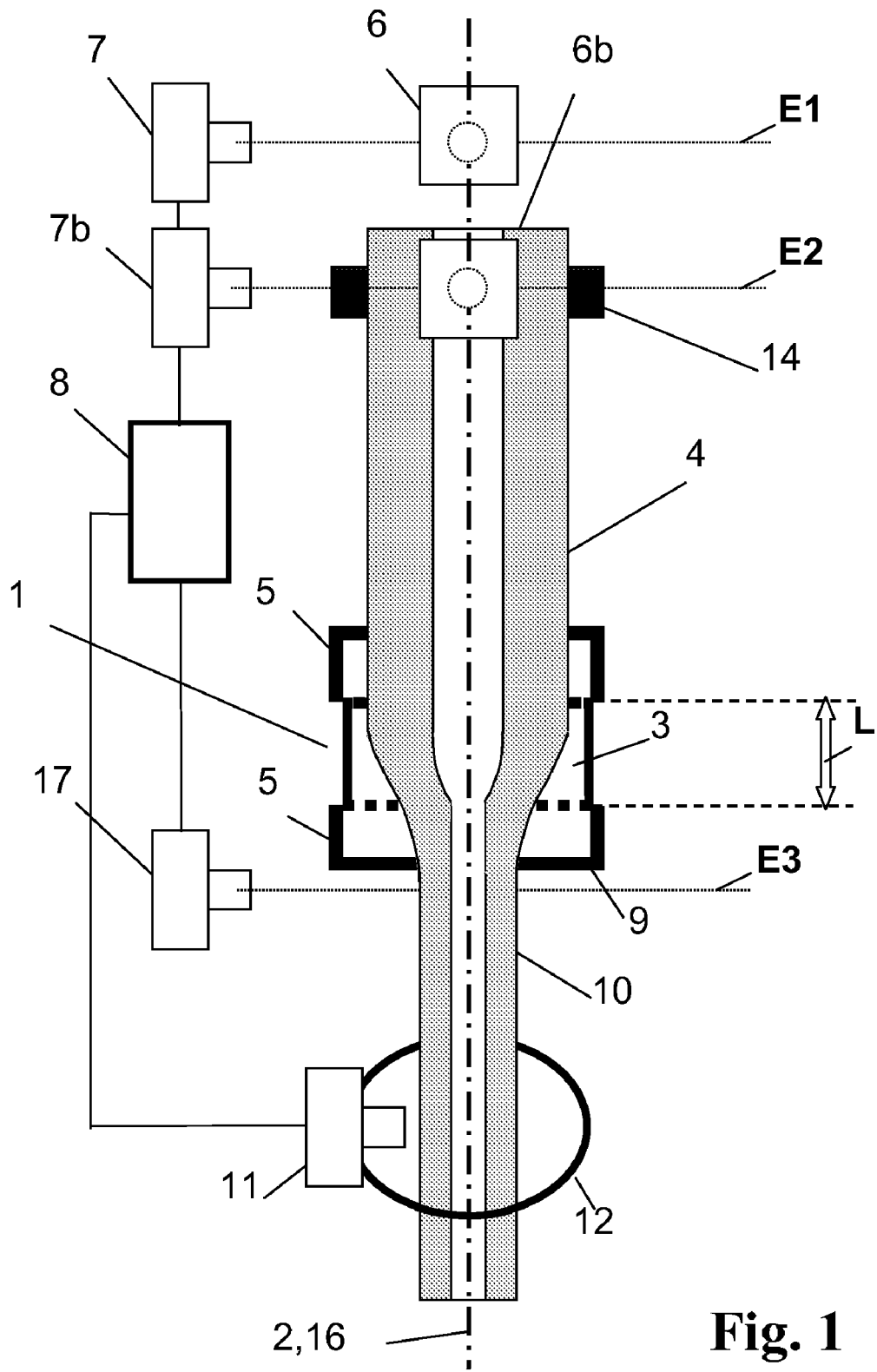

METHOD FOR PRODUCING A TUBE OF QUARTZ GLASS BY ELONGATING A HOLLOW CYLINDER OF QUARTZ GLASS

The present invention relates to a method for producing a tube of quartz glass by elongating a hollow cylinder of quartz glass having an outer diameter AD, which is continuously supplied to a heating zone with a vertically oriented heating tube having an inner diameter d, with the proviso that the diameter ratio d/AD is set to a value ranging from 1.02 to 1.7, and in which method the hollow cylinder is softened zonewise, a tubular strand being drawn off from the softened region and shortened to obtain the tube.

Vertical drawing methods serve the shaping of hollow cylinders of quartz glass without tools to obtain tubes of any desired cross-sectional profile. The resulting tubes are e.g. used as reactors in the chemical industry and in semiconductor manufacture, as lamp tubes in optics, or as a starting material for producing preforms for optical fibers.

EP 1 229 004 A2 describes a generic elongation method for producing a tube of quartz glass for use in preform production. A hollow cylinder having an outer diameter AD of at least 190 mm is here started from. Said cylinder is supplied in vertical orientation from above to a heating tube of graphite having an inner diameter d. The hollow cylinder is here softened zonewise, and a tubular strand is drawn off from the softened region, with a drawing bulb being formed in the softened region. To obtain a tubular strand of small ovality, it is suggested that the diameter ratio d/AD should be set to a value ranging from 1.02 to 1.5 and that during elongation an inert gas stream should be passed from below through the heating tube. The gap width between the inner wall of the heating tube and the hollow cylinder is preferably between 15 mm and 25 mm.

It has however been found that in the known elongation method deviations from the ideal cylinder symmetry of the tubular strand arise time and again, particularly high-frequency diameter variations resulting in waste. The attempt has been made to compensate for radially inhomogeneous heating by rotating the hollow cylinder about its longitudinal axis. This, however, requires great efforts with respect to equipment and control engineering.

It is therefore the object of the present invention to indicate measures for optimizing the dimensional stability of the quartz glass tubes obtained by vertical drawing, and to avoid waste and loss of material.

Starting from the above-mentioned method, this object is achieved according to the invention in that the heating zone has a length L which is set such that the ratio L/d is smaller than 0.9.

Upon use of a heating tube shortened in comparison with the known method with a shorter length L of the heating zone, a comparatively small drawing bulb with a correspondingly smaller drawing bulb mass is obtained. Surprisingly, it has now been found that a smaller drawing bulb mass reacts in a less sensitive way to viscosity variations, which helps to reduce dimensional variations in the drawn-off tubular strand.

The size of the evolving drawing bulb essentially depends on the length L and the diameter d of the heating tube and on the outer diameter AD of the hollow cylinder. It has been found that the above-explained advantageous effect regarding the reduction of dimensional variations is only observed in the drawn-off tubular strand if that at least the following conditions are satisfied:

the diameter ratio d/AD is between 1.02 and 1.7, preferably it is smaller than 1.5, and the ratio L/d is smaller than 0.9, preferably smaller than 0.7.

The length L of the heating zone is the heating tube length that is of relevance to the heating up of the hollow cylinder. In the simplest case the heating zone has an annular geometry. In this case heating zone length L means the dimension of the heated inner wall of the heating tube in drawing direction.

Inner diameter or strength of the heating tube wall may however also vary over the length of the heating tube. In this case the individual longitudinal sections of the heating tube have a different heating impact on the hollow cylinder in that they assume either different high heating temperatures, or in that they have a different distance from the hollow cylinder. In this case length L of the heating zone stands for the dimension within which the temperature acting on the area of the hollow cylinder surface and the drawing bulb surface, respectively, has dropped by not more than 50° C. from the maximum temperature.

The heating tube effects a comparatively short heating zone with a steep temperature gradient, viewed in the axial direction of the hollow cylinder. This results in a relatively short drawing bulb with a small drawing bulb mass. Due to the smaller softened mass, in turn, the natural vibrations of the mass are reduced, resulting in smaller dimensional deviations in the drawn-off tubular strand. One reason therefor may be seen in the fact that natural vibrations of the drawing bulb lead to geometrical variations in the drawn-off tubular strand, which can only be entirely eliminated by drawing off the drawing bulb mass. In the case of small drawing bulb masses the desired geometry is thus resumed within a short drawing period.

On the other hand, even in the case of the short heating zone of the invention, heating power must be provided for an adequate softening of the hollow cylinder. This is done by way of a comparatively higher temperature and a small gap between hollow cylinder and inner wall of the heating tube. This, however, may lead to the escape of impurities out of the heating tube, such impurities negatively affecting the quality of the tubular strand. Therefore, in the case of high-quality quartz glass tubes the use of high-purity heating tube materials, particularly of graphite quality with a low ash content, is required.

On account of the short drawing bulb, the method according to the invention prevents the generation of axial oscillations that easily arise when drawing parameters are changed. Since axial oscillations predominantly arise during tube production on account of the many parameters to be controlled (wall thickness, inner diameter, outer diameter), the method according to the invention has a particularly advantageous effect in the elongation of hollow cylinders for tube production.

It has turned out to be particularly useful when the heating zone has a length between 80 mm and 130 mm, preferably between 100 mm and 120 mm.

The shorter the effective heating zone is, the shorter is the evolving drawing bulb and the smaller is the drawing bulb mass. On the other hand, an adequate heat quantity is needed for heating and softening the hollow cylinder, the heat quantity being provided through the period of action and the heating temperature. In the case of a heating tube length below the said lower limit, the necessary heat quantity can only be provided by way of an uneconomically slow feed rate of the hollow cylinder or by way of an undesired high temperature of the heating tube.

It has turned out to be particularly advantageous when the ratio AD/ID is between 1.15 mm and 2.35 mm, preferably below 2.0, ID being the inner diameter of the hollow cylinder of quartz glass.

This is a comparatively thin-walled hollow cylinder with a large inner bore. It has been found that the method according to the invention is particularly efficient in such start geometries of the hollow cylinder.

Furthermore, it has turned out to be useful when the outer diameter AD is less than 150 mm and is preferably between 130 mm and 140 mm.

The method of the invention is advantageously noticed particularly in hollow cylinders having a comparatively small outer diameter. The above-mentioned lower limit is obtained in that at a given inner diameter of the heating tube a comparatively large annular gap is obtained which reduces the sharpness of the image of the heating zone on the jacket of the hollow cylinder and thus leads to a pronounced axial gradient and a comparatively large drawing bulb.

Moreover, it has turned out to be advantageous when a tubular strand is drawn off with a wall thickness ranging from 0.5 mm to 3 mm.

In the drawn-off tubular strands having wall thicknesses within said range, the method of the invention turns out to be particularly efficient.

Advantageously, the gap width between the inner wall of the heating tube and the hollow cylinder is between 10 mm and 30 mm, preferably below 15 mm.

The smaller the gap between the inner wall of the heating tube and the hollow cylinder, the more accurately is the heating zone imaged onto the hollow cylinder and the smaller is the evolving drawing bulb and the drawing bulb mass. However, with gap widths below the said lower limit, unduly great adjusting efforts are needed for preventing contact of the hollow cylinder with the heating tube.

The invention will now be described with reference to an embodiment and a drawing in more detail.

The drawing shows in detail in

Figure 2:
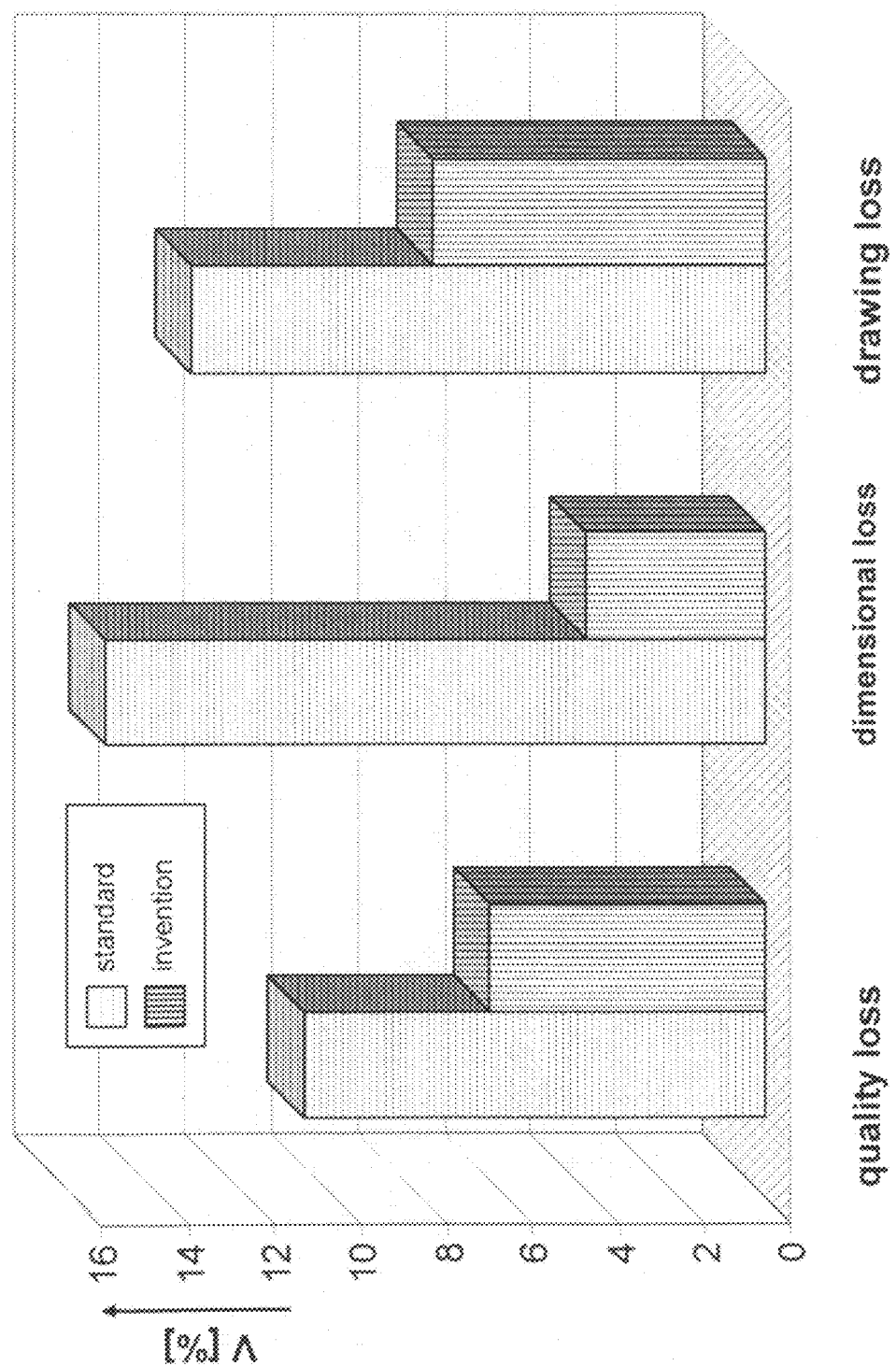

FIG. 1 an apparatus for performing the method of the invention, in a schematic view; and FIG. 2 a bar diagram regarding quality loss, dimensional loss and drawing loss, comparing the use of a heating tube in an elongation method according to the prior art with the use of a heating tube shortened in comparison therewith.

The apparatus according to FIG. 1 comprises a resistance type heating furnace which essentially consists of a vertically oriented heating tube 1 and which encloses a heating zone 3, which is circular in cross section.

The heating tube 1 consists of an annular element having an inner diameter of 193 mm, an outer diameter of 215 mm and a length of 100 m. It consists of high-quality graphite with a low ash content. The heating tube 1 of graphite encloses the heating zone proper. The heating tube 1 is extended at both sides with extension pieces 5 of graphite tube with a length of 100 mm, said extension pieces having an inner diameter of 215 mm and an outer diameter of 260 mm, so that it can be used in the standard drawing furnace without major retrofitting or adapting measures.

Due to the increased wall thickness and the increased distance from the jacket of the hollow cylinder, the temperature acting on the hollow cylinder 4 in the area of the extension pieces 5 is more than 50° C. lower than the maximum temperature in the area of the heating zone.

A hollow cylinder 4 of quartz glass, whose longitudinal axis 16 is aligned in parallel, if possible, with the central axis 2 of the heating tube 1, projects into the upper open end.

At the level of a first detection plane E1 (above the upper end of the heating tube 1), two CCD cameras 6 and 7 are arranged, which in viewing directions perpendicular to each other are each directed onto the central axis 2 and which are each connected to a computer 8.

In a second detection plane E2, which is spaced apart from the first detection plane E1, but still extends above the heating tube 1, two further CCD cameras 6b, 7b are arranged with a viewing direction of 90° relative to each other.

The hollow cylinder 4 is connected to a displacement means 14 by means of which it can be displaced in horizontal direction (xy). The hollow cylinder 4 is softened in the heating zone 3, and a tube 10 is drawn off vertically downwards from the softened area with formation of a drawing bulb 9. The tube 10 is passed through a sliding contact ring 12 in this process, the ring simultaneously serving as a guide rail for a wall-thickness measuring device 11 which is rotatable about the outer circumference of the tube 10. With the wall-thickness-measuring device 11, which is also connected to the computer 8, a wall thickness profile of the drawn-off tube 10 can be recorded during the drawing process, and said profile can be evaluated with the help of the computer 8.

Underneath the heating tube 1 and still in the area of the drawing bulb 9 of the hollow cylinder 4 of quartz glass, a third detection plane E3 is provided and has arranged therein a wall-thickness measuring device 17 which supplies a measurement value for controlling the drawing process.

An embodiment for carrying out the vertical drawing method according to the invention for producing a quartz glass tube with reference to FIG. 1 shall now be explained in more detail.

In the vertically oriented heating tube 1, a hollow cylinder 4 of quartz glass with an outer diameter of 145 mm and an inner diameter of 100 is adjusted such that its longitudinal axis 16 extends in the first detection plane E1 in the central axis 2 of the heating tube 1. On the basis of a vision edge, the position of the hollow cylinder 4 of quartz glass within the heating tube 1 is sensed by means of the CCD cameras 6 and 7 and the corresponding xy-coordinates are stored in computer 8.

The hollow cylinder 4 of quartz glass which is positioned in the central axis 2 of the heating tube 1 is subsequently lowered at a given advance rate into the heating tube 1 so that a mass throughput of 4 kg/h is achieved. In the heating zone, the hollow cylinder 4 is heated to a temperature above 2100° C., the tube 10 of quartz glass being drawn off from the evolving drawing bulb 9 at a controlled drawing rate to a desired outer diameter of 6 mm and a desired wall thickness of 2 mm.

At the same time, the vertical orientation of the hollow cylinder 4 of quartz glass is sensed by means of the two CCD cameras 6b and 7b, and this measurement value is also stored in the computer 8 and used for a corresponding adjustment.

A wall thickness profile of the drawn-off tubular strand 10 is continuously produced by means of the wall-thickness metering device 11 rotating about the tubular strand 10 and is evaluated in the computer 8 such that the amount of the wall one-sidedness (maximum value minus minimum value of the wall thickness) and position of the minimum wall thickness relative to the inner wall of the heating tube 1 is determined.

On the basis of the deviation found in this way in the wall thickness distribution from the ideal geometry, the horizontal xy-position of the hollow cylinder 4 is corrected in computer-controlled fashion by a displacement of its longitudinal axis 16 in the first detection plane E1 until an optimum has been found inside the heating tube 1 in which a satisfactorily accurate cylinder symmetry of the drawn-off tubular strand 10 is obtained. The drawn-off tubular strand 10 is cut into tubes having a length of 1.50 m.

In the bar diagram of FIG. 2, waste "V" in % of the quartz glass volume used in the form of the hollow cylinder is plotted on the y-axis, namely for the types of losses quality loss, dimensional loss and drawing loss during elongation of a hollow cylinder of quartz glass according to the above-explained method of the invention in comparison with a standard method.

In the method of the invention, a small and narrow heating zone is created due to a shorter heating tube and, as a consequence, a short drawing bulb, and the effect of possible axial oscillations is thereby reduced, which improves the dimensional stability of the drawn-off tubular strand and improves the yield.

In the standard method, the same drawing parameters are set as explained above for the method according to the invention. The only difference is that instead of the above-described short heating tube a standard heating tube is used which has an inner diameter of 220 mm, an outer diameter of 240 mm, and a length of 290 mm, and which has the same graphite quality as the heating tube 1 during use in the method of the invention.

When the standard heating tube is used, a considerably larger drawing bulb is obtained in the elongation process, the drawing bulb tending to produce stronger natural vibrations due to the larger softened mass, which negatively affects the dimensional stability of the tubular strand obtained and leads to a poorer yield.

The invention claimed is:

1. A method for producing a tube of quartz glass by elongating a hollow cylinder of quartz glass having an outer diameter AD, said method comprising:
   continuously supplying said hollow cylinder to a heating zone in a vertically oriented heating tube having a heated inner wall with an inner diameter d, the outer diameter AD and the inner diameter d being such that a diameter ratio d/AD is set to a value ranging from 1.02 to 1.7, wherein the hollow cylinder is softened zonewise,
   drawing off a tubular strand from a softened region and cutting said tubular strand so as to obtain the tube,
   wherein the heated inner wall has a total vertical length L such that a ratio L/d of length L to inner diameter d is smaller than 0.7.

2. The method according to claim 1, wherein the outer diameter AD and the inner diameter d being selected such that the diameter ratio d/AD is greater than 1.02 and below 1.5.

3. The method according to claim 2, wherein the hollow cylinder of quartz glass has an inner diameter ID such that a ratio AD/ID of outer diameter AD to inner diameter ID is between 1.15 mm and 2.35 mm.

4. The method according to claim 2, wherein the hollow cylinder of quartz glass has an inner diameter ID such that a ratio AD/ID of outer diameter AD to inner diameter ID is between 1.15 mm and 2.00 mm.

5. The method according to claim 1, wherein the length L is between 80 mm and 130 mm.

6. The method according to claim 1, wherein the outer diameter AD is less than 150 mm.

7. The method according to claim 1, wherein the tubular strand is drawn off with a wall thickness ranging from 0.5 mm to 3 mm.

8. The method according to claim 1, wherein the heated inner wall of the heating tube and the hollow cylinder define a gap therebetween with a gap width that is between 10 mm and 30 mm.

9. The method according to claim 1, wherein length L is between 100 mm and 120 mm.

10. The method according to claim 1, wherein the outer diameter AD is between 130 mm and 140 mm.

11. The method according to claim 1, wherein the heated inner wall of the heating tube and the hollow cylinder define a gap therebetween with a gap width that is between 10 mm and 15 mm.

* * * * *